(12) United States Patent
Owen et al.

(10) Patent No.: US 8,904,299 B1
(45) Date of Patent: Dec. 2, 2014

(54) GRAPHICAL USER INTERFACE FOR ANALYSIS OF A SEQUENCE OF DATA IN OBJECT-ORIENTED ENVIRONMENT

(75) Inventors: James G. Owen, Bolton, MA (US); Rajiv Singh, Worcester, MA (US); Rong Chen, Vernon, CT (US); Pascal Gahinet, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 770 days.

(21) Appl. No.: 11/488,574

(22) Filed: Jul. 17, 2006

(51) Int. Cl.
*G06F 3/048* (2013.01)

(52) U.S. Cl.
USPC ............ 715/764; 715/763; 715/765; 717/108

(58) Field of Classification Search
USPC .................................................. 715/764, 763
See application file for complete search history.

(56) References Cited

U.S. PATENT DOCUMENTS

| | | | | |
|---|---|---|---|---|
| 5,613,084 | A * | 3/1997 | Hau et al. ....................... | 711/219 |
| 5,632,034 | A | 5/1997 | O'Farrell | |
| 5,730,144 | A | 3/1998 | Katz et al. | |
| 5,768,590 | A * | 6/1998 | Kimura et al. ................. | 717/106 |
| 5,782,240 | A | 7/1998 | Raviv et al. | |
| 5,926,822 | A * | 7/1999 | Garman ......................... | 715/201 |
| 6,360,188 | B1 * | 3/2002 | Freidman et al. .................. | 703/1 |
| 6,400,996 | B1 | 6/2002 | Hoffberg et al. | |
| 6,424,989 | B1 | 7/2002 | Shaw et al. | |
| 6,473,794 | B1 | 10/2002 | Guheen et al. | |
| 6,490,719 | B1 * | 12/2002 | Thomas ......................... | 717/107 |
| 6,961,925 | B2 | 11/2005 | Callahan, II et al. | |
| 7,020,697 | B1 | 3/2006 | Goodman et al. | |
| 7,139,999 | B2 | 11/2006 | Bowman-Amuah | |
| 7,181,694 | B2 * | 2/2007 | Reiss et al. ..................... | 715/747 |
| 7,213,227 | B2 * | 5/2007 | Kompalli et al. .............. | 717/108 |
| 7,266,773 | B2 * | 9/2007 | Dorwart ......................... | 715/731 |
| 7,315,826 | B1 | 1/2008 | Guheen et al. | |
| 7,324,924 | B2 * | 1/2008 | Barajas et al. ................. | 702/189 |
| 7,333,907 | B2 * | 2/2008 | Delenstarr et al. .............. | 702/84 |
| 7,512,503 | B2 * | 3/2009 | Bechhoefer et al. ............ | 702/58 |
| 7,577,935 | B2 * | 8/2009 | Reynolds ....................... | 717/106 |
| 7,603,649 | B2 | 10/2009 | Poindexter et al. | |
| 7,660,815 | B1 | 2/2010 | Scofield et al. | |
| 7,805,466 | B2 | 9/2010 | Aspinall | |

(Continued)

OTHER PUBLICATIONS

XML DOM—The Document Object, http://www.w3schools.com/DOM/dom_document.asp, retrieved Jun. 11, 2009.*

(Continued)

*Primary Examiner* — Omar Abdul-Ali
*Assistant Examiner* — Sherrod Keaton
(74) *Attorney, Agent, or Firm* — Nelson Mullins Riley & Scarborough LLP

(57) ABSTRACT

A tool for analyzing a sequence of data in an object-oriented environment is disclosed. In an embodiment, the sequence of data may include time-indexed sequence of data ("time series data"). The tool may provide graphical user interfaces that enable a user to analyze the time series data encapsulated in a time series object or time series collection object. The graphical user interfaces may enable a user to create a time series object and manipulate the data in the time series object or time series collection object. The graphical user interfaces may also display the data in the time series object or time series collection object in various types of plots, such as time plots, spectral plots, x-y plots, correlation plots and histograms.

29 Claims, 12 Drawing Sheets

(56) References Cited

U.S. PATENT DOCUMENTS

| | | |
|---|---|---|
| 8,151,242 B1 | 4/2012 | Takayanagi et al. |
| 2001/0052108 A1 | 12/2001 | Bowman-Amuah |
| 2002/0066076 A1 | 5/2002 | Nagashima et al. |
| 2002/0087416 A1 | 7/2002 | Knutson |
| 2002/0169735 A1 | 11/2002 | Kil et al. |
| 2002/0184401 A1 | 12/2002 | Kadel et al. |
| 2003/0023951 A1* | 1/2003 | Rosenberg .................... 717/104 |
| 2003/0056147 A1 | 3/2003 | Yutkowitz |
| 2003/0058277 A1 | 3/2003 | Bowman-Amuah |
| 2003/0066057 A1 | 4/2003 | RuDusky |
| 2003/0140023 A1 | 7/2003 | Ferguson et al. |
| 2003/0177187 A1 | 9/2003 | Levine et al. |
| 2004/0015579 A1 | 1/2004 | Cooper et al. |
| 2004/0070594 A1 | 4/2004 | Burke |
| 2004/0107125 A1 | 6/2004 | Guheen et al. |
| 2004/0225636 A1 | 11/2004 | Heinzel et al. |
| 2004/0230445 A1 | 11/2004 | Heinzel et al. |
| 2005/0047646 A1* | 3/2005 | Jojic et al. .................... 382/159 |
| 2005/0144540 A1* | 6/2005 | Fujishiro et al. ................ 714/48 |
| 2005/0183073 A1 | 8/2005 | Reynolds |
| 2005/0246161 A1 | 11/2005 | Sakurai |
| 2005/0283751 A1* | 12/2005 | Bassin et al. .................. 717/100 |
| 2005/0288863 A1 | 12/2005 | Workman |
| 2006/0026560 A1 | 2/2006 | Kornerup et al. |
| 2006/0095833 A1* | 5/2006 | Orchard et al. ............... 715/503 |
| 2006/0161071 A1 | 7/2006 | Lynn et al. |
| 2006/0200259 A1 | 9/2006 | Hoffberg et al. |
| 2006/0259949 A1 | 11/2006 | Schaefer et al. |
| 2007/0112714 A1 | 5/2007 | Fairweather |
| 2008/0297513 A1 | 12/2008 | Greenhill et al. |
| 2009/0089657 A1 | 4/2009 | Davis |
| 2009/0228253 A1 | 9/2009 | Tolone et al. |
| 2009/0240586 A1 | 9/2009 | Ramer et al. |
| 2009/0319672 A1 | 12/2009 | Reisman |
| 2010/0094878 A1 | 4/2010 | Soroca et al. |

OTHER PUBLICATIONS

Northrop, Linda M. Object-Oriented Development, Jan. 15, 2002. http://mrw.interscience.wiley.com/emrw/9780471028956/ese/article/sof222/current/html?hd=All,object#sof222-sec1-0003.*

Time-Series Objects, http://web.archive.org/web/20050416064940/stat.ethz.ch/R-manual/R-patched/library/stats/html/ts.html, Apr. 16, 2005.*

Li, Quanzhong et al., "Skyline Index for Time Series Data," IEEE Transactions on Knowledge and Data Engineering, vol. 16(6):669-684 (2004).

Matus-Castillejos, Abel et al., "A Time Series Data Management Framework," Proceedings of the International Conference on Information Technology: Coding and Computing, vol. 1:220-225 (2005).

Dreyer, Werner et al., "An Object-Oriented Data Model for a Time Series Management System," IEEE, pp. 186-195 (1994).

* cited by examiner

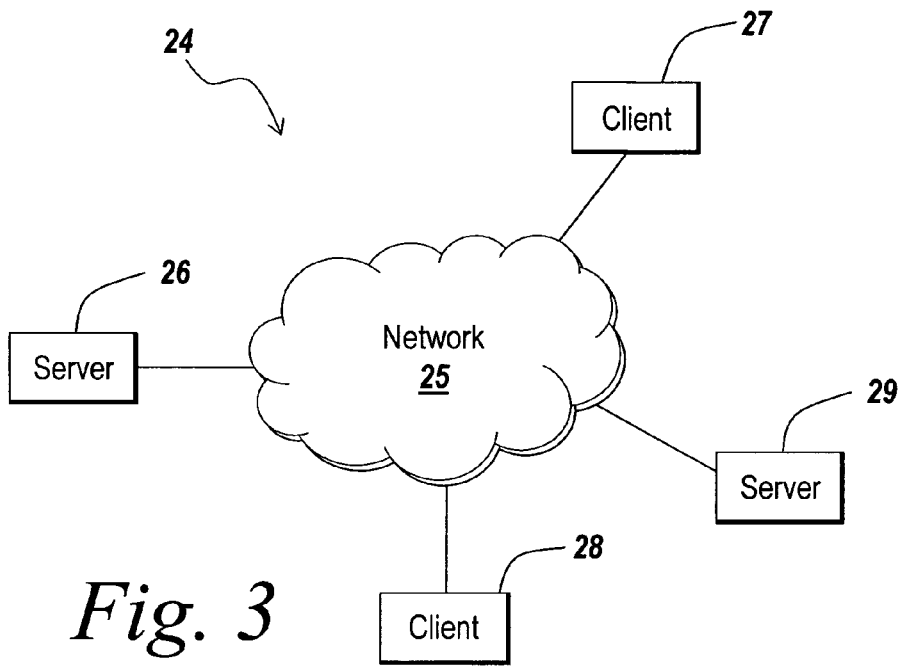
*Fig. 3*
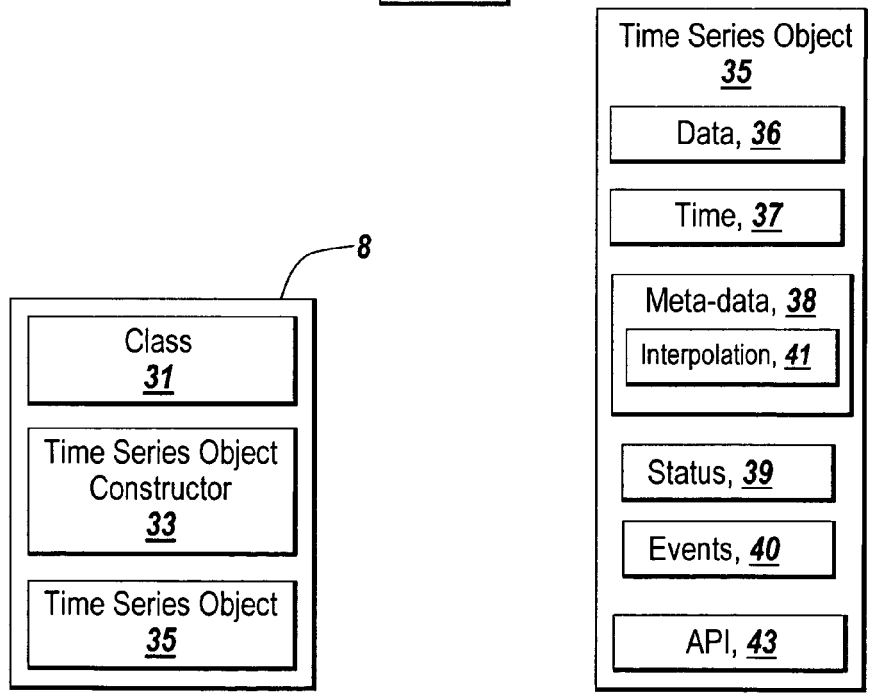
*Fig. 4A*　　　*Fig. 5*

GRAPHICAL USER INTERFACE FOR ANALYSIS OF A SEQUENCE OF DATA IN OBJECT-ORIENTED ENVIRONMENT

FIELD OF THE INVENTION

The present invention relates generally to a data analysis tool, and more particularly to a method, system and medium for providing graphical user interfaces that enable a user to analyze a sequence of data in an object oriented environment.

BACKGROUND OF THE INVENTION

Data can be generated and analyzed in an indexed sequence of data. Time series data is a sequence of data measured at succesive times spaced apart at time intervals. The time series data can be analyzed to make forecasts or predictions of future events based on known past events. In the financial industry, for example, time series data, such as equity price or interest fluctuations, can provide forecasts or predictions of a future price of a share of stock or interest rate based on the past data.

Non-uniformly sampled time series data may be difficult to analyze because most analytical methods or algorithms such as those used for forecasting, filtering or spectral analysis, assume that a uniform separation of data sample times. Similarly they can be difficult to combine and compare because comparable data will not necessarily occur at exactly the same times. Therefore it is desired to modify time series data through operations, such as re-sampling and interpolation, to overcome these problems. In particular, when data is generated from the multiple tests or simulations of a system, each test or simulation may produce data with it's own time index. Therefore, it is desired to provide a method for representing and analyzing time series data in an easy and efficient manner.

SUMMARY OF THE INVENTION

The present invention provides a data analysis tool for analyzing a sequence of data in an object-oriented environment. An object-oriented environment is a computing environment organized around "objects" rather than procedures. In the object-oriented environment, programmers define the data type of a data structure and the types of operations and functions that can be applied to the data structure. The data structure becomes an object that includes both data and functions. In addition, programmers can create relationships between one object and another. One of the advantages of the object-oriented environment is that it enables programmers to create modules that do not need to be changed when a new type of object is added.

In an embodiment, the sequence of data may include a time-indexed sequence of data ("time series data"). The present invention may provide easy and efficient methods of linking time and data when processing and analyzing time series data. For example, operations, such as filtering, Fourier transforming or forecasting timed data, require knowledge of the time stamp of each data sample. Encapsulating the time, data and metadata within a single object simplifies the syntax of a programming language which performs these types of tasks on data by grouping all the required variables in a single entity. Furthermore, the probability of an error in analysis or programming is reduced by maintaining the time and data correctly synchronized at all times.

The data analysis tool may enable a user to generate a time series object for encapsulating the time series data in the object-oriented environment. The user may construct the time series object from data or mathematical expressions. The time series object may include a data array and a time array. The data and time arrays in the time series object may be a numeric array. Alternatively time and data may be represented by a sequence of objects implementing APIs that supply an interface for analyzing the time series data within the time series object. The user may analyze the time series data encapsulated in the time series object using the APIs of the time series object.

In another embodiment of the present invention, a user may create multiple time series objects for storing different sequences of time series data. The present invention may enable the user to create a time series collection object in which one or more time series objects can be grouped or wrapped. In this state the time series objects may store their time vectors in a common time array in the time series collection object. The methods of the time series collection object can be applied to the time series data of each time series object in the time series collection object simultaneously, and hence enable the user to analyze the ensemble of time series data within the time series collection with a single operation.

The data and time arrays of a time series object can be stored as references to external data using a data storage object to represent the connection to the external data source. The data storage object provides a wrapper with a consistent interface for data access APIs specific to each data source. When a user reads or writes data to the data or time arrays of the time series object, the data will be read from or written to the data storage object, which in turn reads or writes data to the data source via the data access API.

Abstraction of a data source can provide the option of storing the data of a time series object in an external data source, such as a database or file. The use of references to external data sources as an alternative to storing the data within the time series object can enable a user to manage memory more efficiently when working with large data sets or with large numbers of time series objects. Furthermore, managing the connection to external data within the time series eliminates the need for the user to manually read or write from an external data source. Abstracting data storage using data storage objects can also be used to optimize the method of storage within the time series object. For example, the storage object can store the data internally to the object-oriented environment in a compressed form using a lossless compression algorithm or mathematical expression to represent the data more succinctly.

The data analysis tool may provide graphical user interfaces that enable a user to analyze the time series data encapsulated in the time series object or time series collection object. The graphical user interfaces may enable a user to create a time series object and manipulate the data in the time series object or time series collection object. The graphical user interfaces may also display the data in the time series object or time series collection object in various types of plots, such as time plots (plots of data against time), spectral plots (e.g., periodiograms), x-y plots (plots of the time series data in one time series against another), correlation plots (autocorrelation plots for a single time series or cross-correlation plots on time series against another) and histograms.

In accordance with one aspect of the present invention, a system is provided for analyzing a sequence of data in an object oriented environment. The system includes a graphical user interface for enabling a user to create a series object that encapsulates the sequence of data. The series object has properties and methods, and the properties of the object include the sequence of data, the indices of the sequence of data and metadata describing the sequence of data. The graphical user interface includes panes for enabling the user to specify data sources for the sequence of data, and the indices of the sequence of data.

In accordance with another aspect of the present invention, a computer-implemented method is provided for analyzing a sequence of data in an object oriented environment. The method provides a graphical user interface for enabling a user to create a series object that encapsulates the sequence of data. The series object has properties and methods, and the properties of the object include the sequence of data, indices of the sequence of data and metadata describing the sequence of data. The graphical user interface enables the user to specify data sources for the sequence of data, and the indices of the sequence of data.

In accordance with another aspect of the present invention, a medium holding computer executable instructions is provided for a method of analyzing a sequence of data in an object oriented environment. The method provides a graphical user interface for enabling a user to create a series object that encapsulates the sequence of data. The series object has properties and methods, and the properties of the object include the sequence of data, indices of the sequence of data and metadata describing the sequence of data. The graphical user interface enables the user to specify data sources for the sequence of data, and the indices of the sequence of data.

BRIEF DESCRIPTION OF THE DRAWINGS

The aforementioned features and advantages, and other features and aspects of the present invention, will become better understood with regard to the following description and accompanying drawings, wherein:

FIG. 3 is an exemplary network environment that enables an online implementation of the present invention;

FIG. 4A shows an exemplary analysis tool depicted in FIG. 1;

FIG. 5 shows an example of the time series object depicted in FIG. 4A;

DETAILED DESCRIPTION

The illustrative embodiment of the present invention provides a data analysis tool for analyzing time series data in an object oriented environment. Although the data is indexed with time in the illustrative embodiment, one of ordinary skill in the art will appreciate that the data can be indexed with different quantities, such as frequency and position, in other embodiments. The object-oriented environment may enable a user to create a time series object for encapsulating the time series data. The time series object may include a data array and a time array. The time array may contain the time index of each data in the data array. The time series object may implement APIs that provide an interface for analyzing the time series data in the time series object.

In illustrative embodiment of the present invention, the user may create multiple time series objects for storing different sequences of time series data. The object-oriented environment may enable the user to create a time series collection object in which one or more time series objects can be wrapped or contained. The time series objects may share a common time array in the time series collection. With the time series collection object, the user can analyze multiple sequences of time series data simultaneously.

The data analysis tool of the illustrative embodiment may provide graphical user interfaces that enable a user to analyze the data in the time series object or the time series collection object. The graphical user interfaces may enable a user to import data from files, databases, and other sources into the data analysis tool and to create a time series object or time series collection object. The graphical user interfaces may also enable a user to manipulate data in the time series object or time series collection object. The graphical user interfaces may display the data in the time series object or time series collection object in various types of plots, such as time plots, spectral plots, x-y plots, correlation plots and histograms, so that the user can view the data in the time series object or time series collection object.

Figure 1:
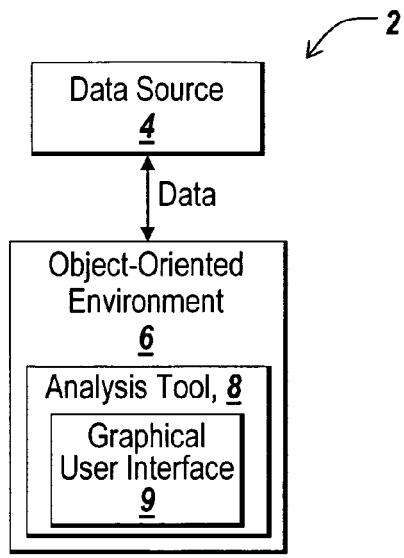
FIG. 1 depicts an exemplary system suitable for practicing the illustrative embodiment of the present invention.

FIG. 1 is an exemplary system 2 suitable for practicing the illustrative embodiment of the present invention. The system 2 includes a data source 4 and an object-oriented environment 6 coupled to the data source 4. Although the data source 4 is depicted externally to the object-oriented environment 6 in the illustrative embodiment, one of ordinary skill in the art will appreciate that the data source 4 can be provided internally to the object-oriented environment 6. The data source 4 can be a file, a database, a storage device or a data acquisition device where the communication is mediated through APIs wrapped in a data source object. One of ordinary skill in the art will also appreciate that these data sources are illustrative and the data source 4 can be provided in different form, for example as an algorithm which generates data from, or represents data as, a mathematical expression in other embodiments.

An exemplary object oriented environment 6 can be provided by MATLAB® from The MathWorks, Inc. of Natick, Mass. MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, Fortran, and Java with the MATLAB® applications.

MATLAB® supports dynamically typed programming. In a dynamically typed programming environment, types are assigned to each data value in memory at runtime, rather than assigning a type to a static, syntactic entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program.

The object-oriented environment 6 may provide a tool 8 for receiving time series data from the data source 4 and analyzing the time series data to provide a user with useful information on the time series data. The tool 8 may enable the user to create a time series object for encapsulating the time series data received from the data source 4. The tool 8 may also provide functions and methods to support the analysis of the time series data including plotting, descriptive statistics, correlation, interpolation, filtering, Fourier analysis, etc. The tool 8 may provide graphical user interfaces 9 that enable the user to create the time series object and analyze the data in the time series object, possibly using methods and algorithms that require explicit knowledge of the times at which the data was sampled. The graphical user interfaces 9 may also display the data in the time series object so that the user can view the data in the time series object, possibly using plots or views which use and convey information about the sample times of the data. The tool 8 is described below in more detail with reference to FIGS. 4A-13.

One of ordinary skill in the art will also appreciate that the data source 4 and the analysis tool 8 may be provided on the same device, which will be described below in more detail with reference to FIG. 2, or alternatively, the data source 4 and the object-oriented environment 6 may be coupled to each other via a communication network, which will be described below in more detail with reference to FIG. 3.

Figure 2:
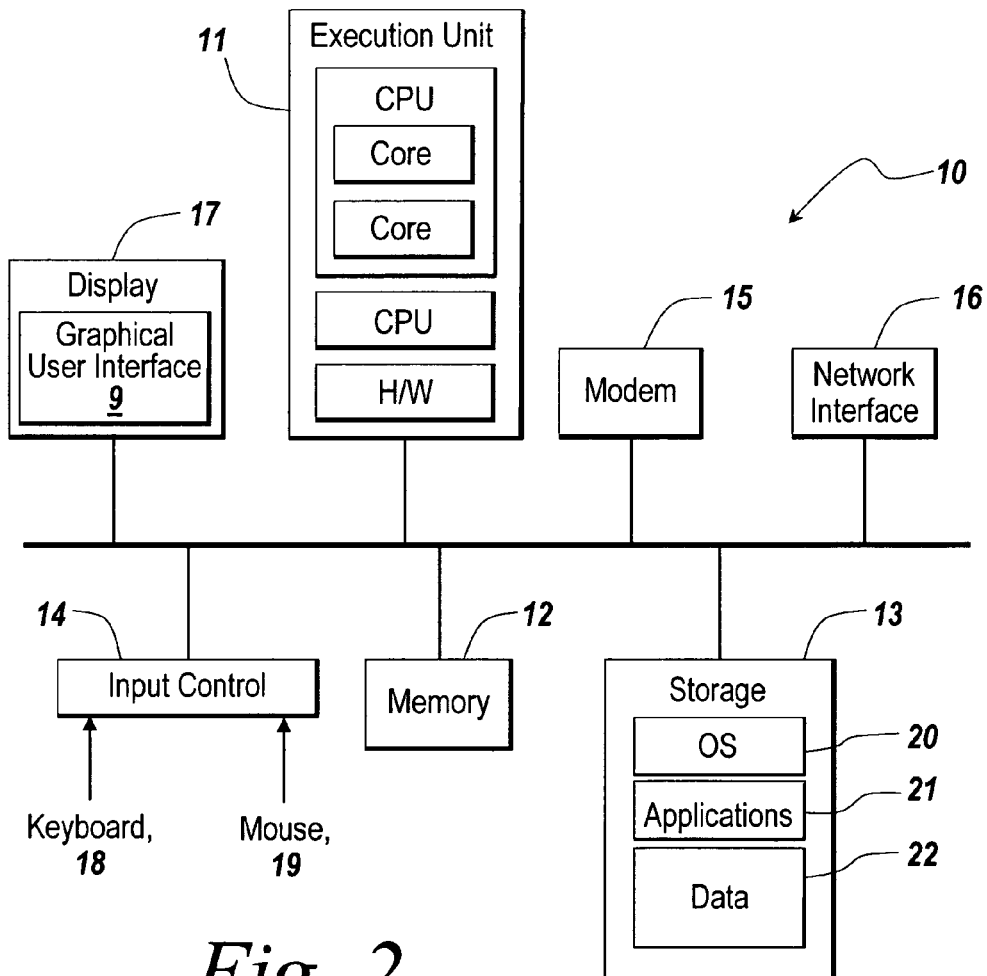
FIG. 2 is an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide the data source 4, the object-oriented environment 6 and the analysis tool 8. The memory 12 temporarily stores instructions and data and provides them to the execution unit 11 so that the execution unit 11 operates the computing device 10 and runs the analysis tool 8.

Optionally, the computing device 10 may include multiple Central Processing Units (CPUs) for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

The storage 13 usually contains software tools for applications. The storage 13 includes, in particular, code 20 for the operating system (OS) of the device 10, code 21 for applications running on the operation system including the object-oriented environment 6 and the analysis tool 8, and data 22 of the data source 4. Those of ordinary skill in the art will appreciate that the application can be stored in the memory 12 as well, much like the data, and even the OS, or they can be stored on the network described below with reference to FIG. 3.

The input control 14 may interface with a keyboard 18, a mouse 19, and other input devices. The computing device 10 may receive through the input control 14 input data, such as the input data for selecting analysis methods. The computing device 10 may display on the display 17 user interfaces 9 for generating the time series object and manipulating and viewing the time series data in the time series object.

FIG. 3 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the client 28 may include the data source 4 and send time series data to the server 26 for analysis. The server 26 may include the analysis tool 8 and perform the analysis of the time series data received from the client 28. The server 26 then returns the analysis results to the client 28 and the client 28 may subsequently display the data to the user with the analyzed information on the data.

FIG. 4A is an exemplary tool 8 provided in the illustrative embodiment of the present invention. The tool 8 may provide a class 31 and a constructor 33 for enabling a user to construct a time series object 35. The time series object 35 is an instantiation of the class 31. The class 31 defines the properties and methods of the time series object 35. The class 31 may contain data and time values, as well as metadata information including units, events, and status information and interpolation methods of the time series data. The user may use the constructor 33 to create an instance of the time series object 35.

Figure 4B:
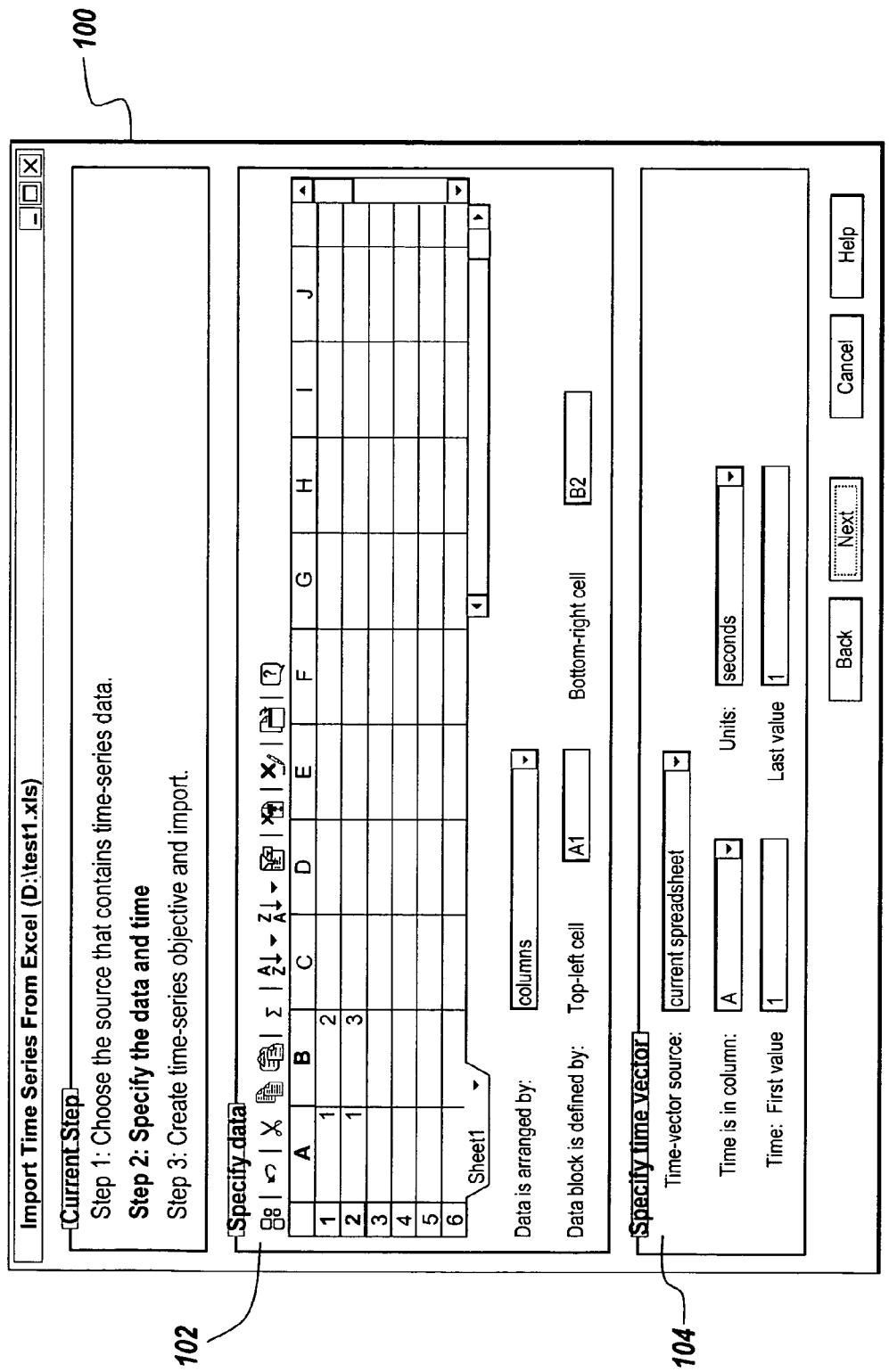
FIGS. 4B and 4C show exemplary graphical user interfaces provided in the illustrative embodiment.

The analysis tool 8 may provide an import wizard for importing data from the data sources 4 to create the time series object 35. FIG. 4B shows an exemplary import wizard 100 provided in the illustrative embodiment. The import wizard 100 may provide three steps (each possibly including sub-steps) to import the data from the data sources 4 to create the time series object 35 in the illustrative embodiment. In the first step, the user may choose the data source that contains time series data. The data source 4 may include spreadsheets, text files, or other types of data sources 4, for example, MAT files or MATLAB® arrays in the MATLAB® environment. In the next step, the import wizard 100 may provide panes 102 and 104 for the user to specify the location of the data within the information stored in the data source and the location of time within the information stored in a possibly different data source. The wizard 100 may then enable a user to construct a time series object using three elements defined in this step: the time series data, the time vector and the metadata. In the pane 102, the user may specify the location of time series data to be encapsulated in the time series object 35. In the pane 104, the user may specify the time vector and define some metadata, such as the units of the time vector. The user can assign separate data sources to the time vector and the series data. In the last step, the import wizard 100 copies the data from the data source(s) into the internal data storage of the time series objects and creates the time series object using the elements specified in the import wizard 100. In the illustrative embodiment, the import wizard 100 may call one of the following constructor syntaxes 33 to create the time series object 35.

Ts=timeseries; Creates an empty time series object

Ts=timeseries (data); Creates a time series object from the variable 'data' with a default time vector where 'data' is either a numeric array or a sequence of objects implementing APIs to access the data.

Ts=timeseries (data,time); Creates a time series object with the specified time vector where 'time' is a numeric array or a cell array of date strings representing the time vector.

Ts=timeseries (data,time,prop1,val1,prop2,val2, . . . ); Creates a time series object with properties assigned as specified where 'prop1','prop2', etc are strings describing properties of the time series objects and 'val1','val2', etc are the corresponding values of those properties.

Those of ordinary skill in the art will appreciate that the constructor syntax described above is illustrative and other syntaxes may be used in other embodiments of the present invention.

Figure 4C:
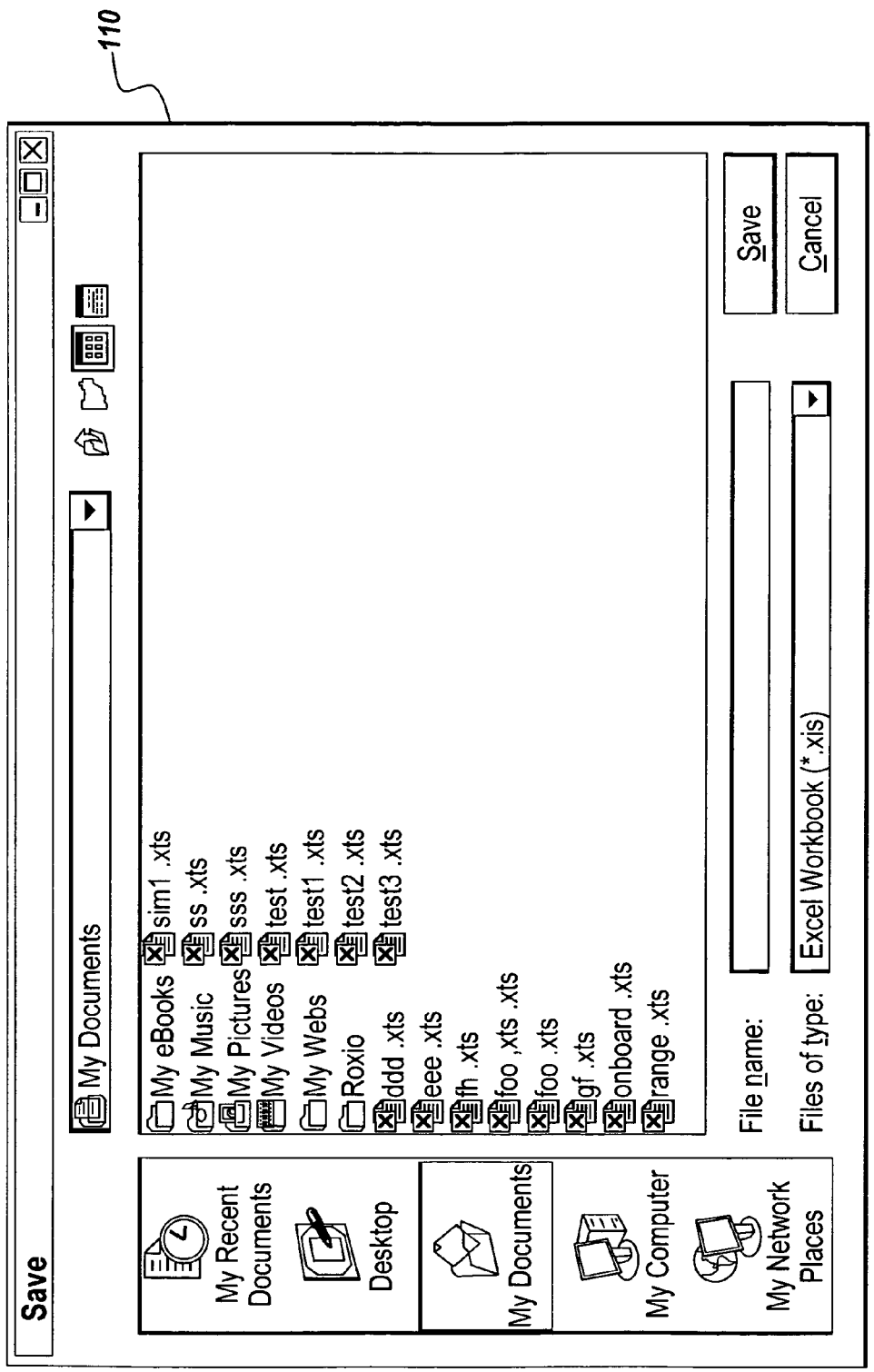

The tool 8 may also provide an export tool for exporting the time, data, status and metadata stored within a time series object 35 into a spreadsheet, text file, or other file type. FIG. 4C is an exemplary graphical user interface 110 that enables a user to export the time series objects into a spreadsheet. The graphical user interface 110 enables the user to enter a file name of the spreadsheet into which the time series objects are exported. When the user saves the time series data in the file, the properties of the time series object including the time vector and data array with additional metadata for units, interpolation, variable names can be exported to a spreadsheet where time and data arrays are assigned to columns of the spreadsheet and metadata is encoded as a header. Those or ordinary skill in the art will appreciate that the spreadsheet is illustrative and the time series object can be exported into other types of data sources, such a comma-separated values (CSV) file and MAT file and MATLAB® arrays in the MATLAB® environment.

FIG. 5 shows an example of the time series object 35 constructed in the illustrative embodiment. The time series object 35 may contain properties of the object 35, including data 36, time 37, data status 39, metadata 38, and events 40 of the object 35. The data 36 can be a scalar, a vector or a multidimensional array. The time field 37 contains information for indexing the data 36. Its contents can be specified directly as a numeric array or cell array of dates or indirectly using metadata by defining start time, end time and interval between two subsequent time values. Other descriptive information about data and time, data, interpolation method information 41, etc is also stored as metadata 38. Those of ordinary skill in the art will appreciate that although the status 39 and events 40 are depicted separately from the metadata 38 in the illustrative embodiment, the status 39 and events 40 can be included in the metadata 38 in a different embodiment. The time series object 35 contains this information in a single structure.

In particular, the user may encapsulate the status information 39 of the time series data in the time series object 35. These cases often arise if the data in the time series object 35 is derived from experimental data, databases, communication links etc., where there may a need to distinguish parts of the data using criteria which are not expressed in the numerical values of the data itself. For example, in a data set expressing the results of a sequence of experiments, there may be a need to identify the data associated with some of the experiments as being invalid or suspect without explicitly removing those records from the data set. In another example, if data is recorded from a communication channel, there may be a need to identify parts of the data as being compromised by transmission conditions.

The time series object 35 enables numeric data to be optionally 'tagged' with an array of integer status values. The status value array may be as large as the numeric data array in the time series object. The integer status values may be drawn from an enumerated list of integers which are paired with text descriptions of their meanings in a look-up table stored within the time series object in another metadata object. An advantage of tagging the status of each data point is that it enables the data to be processed conditionally by the dataset object methods, depending on the status of that data.

Figure 6:
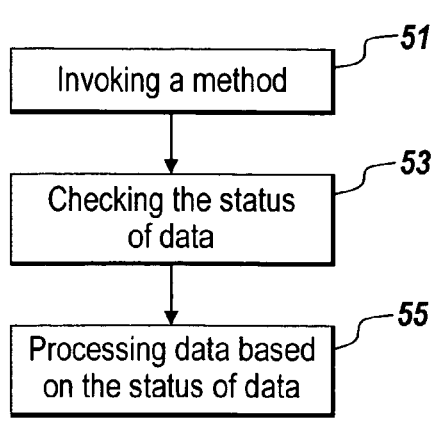
FIG. 6 is a flow chart showing an exemplary operation for the conditional processing of time series data.

FIG. 6 is a flowchart showing an exemplary operation for the conditional processing of time series data. The conditional processing can be performed by making methods take actions depending on the status values of the data stored in the object. For example, when the 'mean' method is called on a time series object to calculate the mean of the data values in the time series (step 51), a list of status values identifying data as missing or invalid can be passed to the method. The method can then check the status values (step 53) and exclude any data with the missing or invalid status values (step 55). By employing status values in this manner, the user can amongst other things exclude subsets of the data (within data set objects) when calling statistical methods, such as mean, median, standard deviation, etc.

Referring back to FIG. 5, the time series object 35 may also include objects implementing APIs 43 for providing an interface for a user to manipulate and analyze the time series data in the time series object 35. The APIs 43 may include functions or methods for manipulating, analyzing, plotting, correlating, interpolating and filtering the data 36 and time 37 in the object 35. The APIs 43 may provide overloaded methods, such as descriptive statistical methods (mean, median, std, iqr, etc.) which compute statistics on time series data with options to weight data by time interval, signal processing methods (fft, filter, idealfilter, detrend) which process the time series data making explicit use of the encapsulated time vector, and overloaded base MATLAB® methods (loadobj, size, end, transpose, isempty, length, plot) which are customized for time series objects.

The APIs 43 may include functions or methods that enable the user to combine and re-sample time series data in the time series object. Using the APIs 43, the time series data in the time series object can be re-sampled at different times. Processing of time series data may involve re-sampling operations frequently. For example, a non-uniformly sampled time series may be re-sampled at a uniform rate in order to take a Fourier transform or perform a filtering operation. Two time series that are sampled at different times may be re-sampled onto the same time vector before they can be added together. When re-sampling operations involve adding new samples to the time series for time instants that were not in the original data set, the data corresponding to those new time instants may be estimated from the existing data by interpolating or extrapolating the data. The re-sampling may also apply to the analysis of multi-rate data logged from a simulation system.

Figure 7:
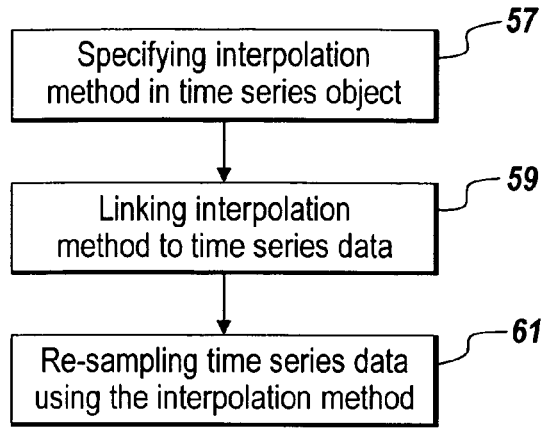
FIG. 7 is a flow chart showing an exemplary operation for re-sampling time series data.

FIG. 7 is a flow chart showing an exemplary operation for re-sampling the time series data. The illustrative embodiment enables a user to specify the interpolation method 41 within the times series object 35 (step 57). The interpolation method is linked to the times series data in the object (step 59). The appropriate method for performing the interpolation or extrapolation can be determined by the conditions under which the data is collected. For example, if a time series represents the results of simulation or a real time system, a zero order hold type interpolation can be used to estimate data between samples to avoid the need for non-causal estimation. Alternatively, in cases where re-sampling can cause aliasing, the interpolation method can employ an anti-aliasing filter as part of the interpolation method.

Since the object 35 includes information on the interpolation method 41, the illustrative embodiment enables an automatic interpolation/extrapolation operation of time series data when re-sampling time series data (step 61). In the illustrative embodiment, the time series object stores a function handle defining the interpolation algorithm to be used when that time series is re-sampled by its methods or other calculations. An anonymous function handle or other representation of a mathematical formula can be used to represent the interpolation method to be used. The benefit of linking time series objects and their interpolation algorithms is that the syntax of combining time series objects using methods, such as overloaded arithmetic or re-sampling, is simplified by avoiding the need to specify the interpolation method to be used whenever calculations require resampling, extrapolation or interpolation.

Figure 8A:
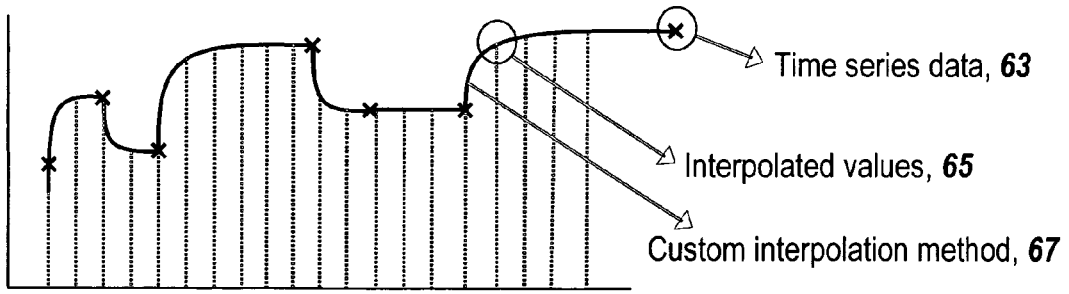
FIG. 8A depicts an exemplary interpolation of time series data in the illustrative embodiment.

FIG. 8A depicts exemplary time series data 63 interpolated using the custom interpolation method 67 specified in the time series object 35. The non-uniform time series data 63 is re-sampled at a uniform rate with the addition of the interpolated values 65. Where two or more time series objects with different interpolation methods are combined to produce additional time series objects (such as for overloaded arithmetic operations), precedence rules may be used to determine which interpolation method carries through to the resulting objects. This requires that a hierarchy of interpolation methods be established so that the precedence rule can select the output object interpolation method as the hierarchically extreme value among a list of input interpolation methods.

Figure 8B:
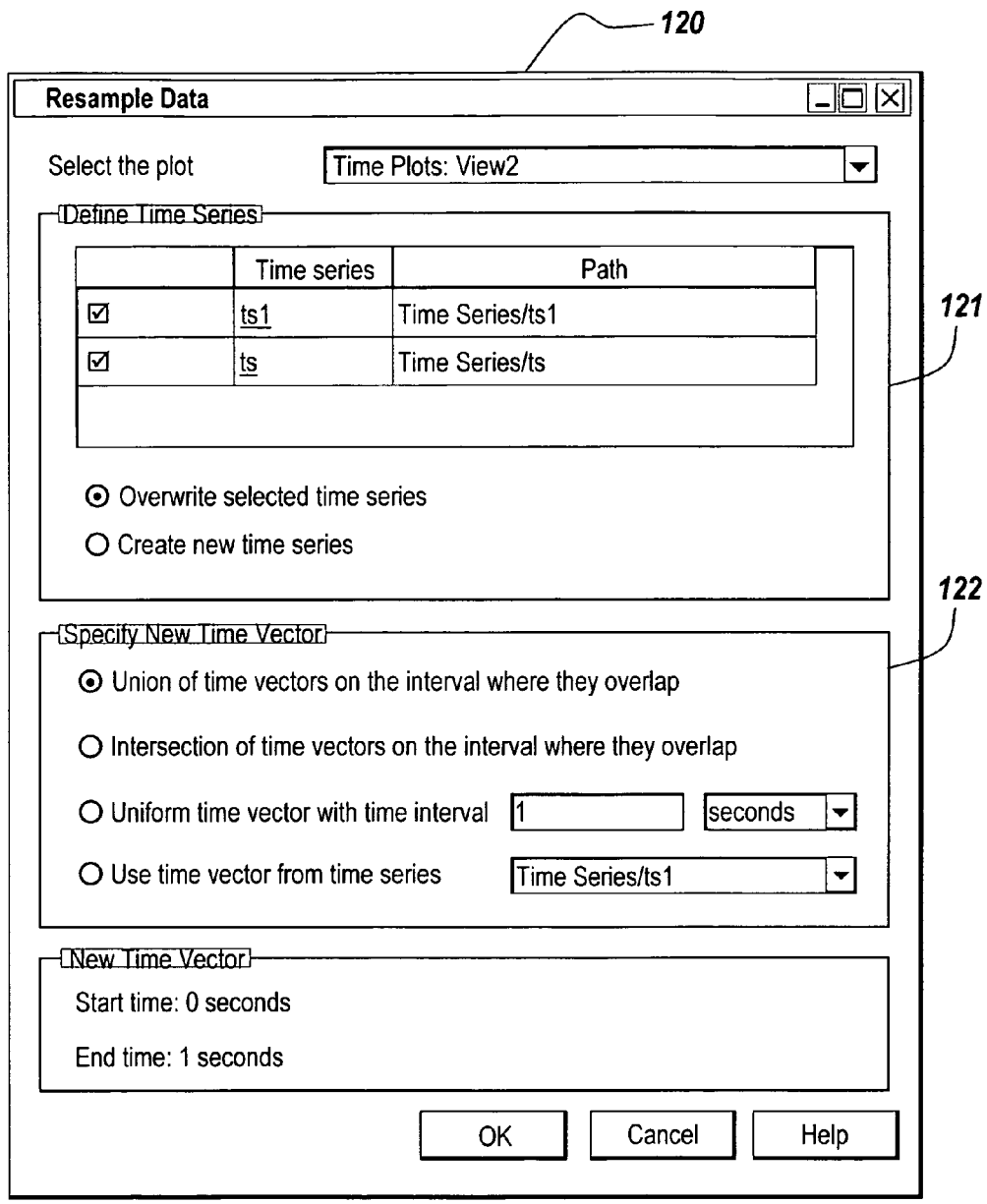
FIG. 8B shows another exemplary graphical user interface provided in the illustrative embodiment.

FIG. 8B shows an exemplary portion of a graphical user interface 120 that enables a user to resample the time series objects using the interpolation methods specified in the time series object. The graphical user interface 120 may provide a pane 121 for the user to select one or more time series objects to be re-sampled. The graphical user interface 120 may enable the user to merge multiple time series objects onto a common time vector in the illustrative embodiment. The selected time series objects may be overwritten with resampled data or a new time series object can be created to contain the resampled data. This re-sampling is useful in many analysis operations, such as cross-correlation analysis, that requires two or more time series object to be sampled at the identical time instants. The graphical user interface 120 may provide a pane 122 for the user to specify the common time vector. The common time vector may be defined in the pane 122 by selecting either: i) the union of the constituent time series time vectors on the largest time interval common to all the time series objects; ii) the intersection of the time vectors of the constituent time series; or iii) a uniform time vector defined by the user. When a single object is selected in the pane 121, the options i) and ii) may be unavailable in the pane 122. Once the common time vector is defined, the time series data may be re-sampled using the information specified in the interface 120.

Referring back to FIG. 5, the time series object may also include APIs for sub-selecting time series data. In many data analysis tasks the first step often selecting a period of interest for further analysis. The illustrative embodiment may provide methods to extract data from the time series object 35 using time intervals bounded by events 40. Events are tags or labels attached to a time series object which represent a particular time. The methods may optionally interpolate time series data at the end points using the interpolation method specified in the time series object 35.

Figure 9A:
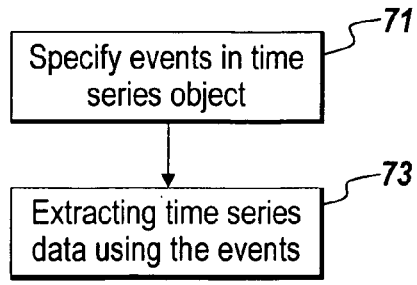
FIG. 9A is a flow chart showing an exemplary operation for extracting a portion of time series data.

FIG. 9A is a flow chart showing an exemplary operation for selecting a period of interest in the time series object. The user may implement event objects in the time series object 35 to represent time instants of interest with string valued descriptions (step 71). For example, a flight test data set using time series objects may contain event objects representing the times of take-off and landing events. The primary purpose of these events is to aid the user in extracting data from periods of interest. In the flight test example, the data between take-off and landing events can be extracted by calling a method of the time series object(s) representing the flight data and passing the names of the take-off and landing events (step 73). The time series object 35 may provide a number of methods which accept one or more event names specifying the start and end times of intervals of interest and returning a time series object representing the time series data contained within those intervals. Other purposes of event objects are to align time series whose time vectors are offset due to differing zero reference times and to annotate periods of interest within plots of time series data. Additionally some types of event object may depend upon the time series data, so that if the data changes, the location of that type of event may change. This enables events to represent the timing of key features of the data, such as the first time that the altitude in flight test data exceeds 10000 ft.

Figure 9B:
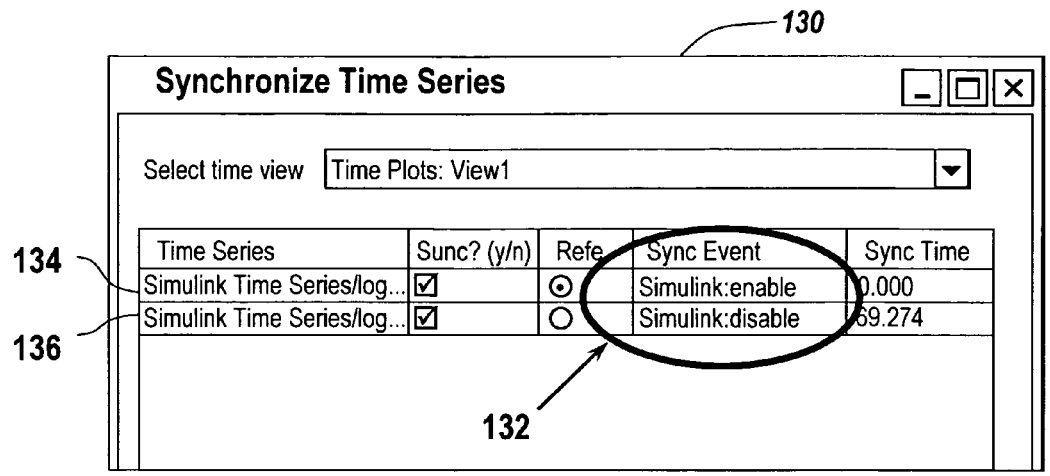
FIGS. 9B-9F show additional exemplary graphical user interfaces provided in the illustrative embodiment.

The events may also be used to synchronize time series objects for analysis. FIG. 9B shows an exemplary tabular control 130 for shifting time series data by aligning events. In the illustrative embodiment, the events 132 are used as anchor points when performing time shift operations on a set of time series objects in a plot. The tabular graphical user interface allows a user to align the time vectors of different time series objects so that a certain set of events occur at the same time after the shift. In the illustrative embodiment, the lower time series object 136 having the event "Simulink:disable" may be shifted to align the event "Simulink:disable" to the event: "Simulink:enable" of the upper time series object 134 so that the event "Simulink:disable" of the lower object 136 and the event "Simulink:enable" of the upper time series object 134 occur at the same time in a time plot. For another example, if three time series objects within in a time plot all contain the event with the name "launch" at three different times, relative time shifts can be applied so that after the shift the "launch" event occurs at the same time in each of three time series objects.

Figure 9C:
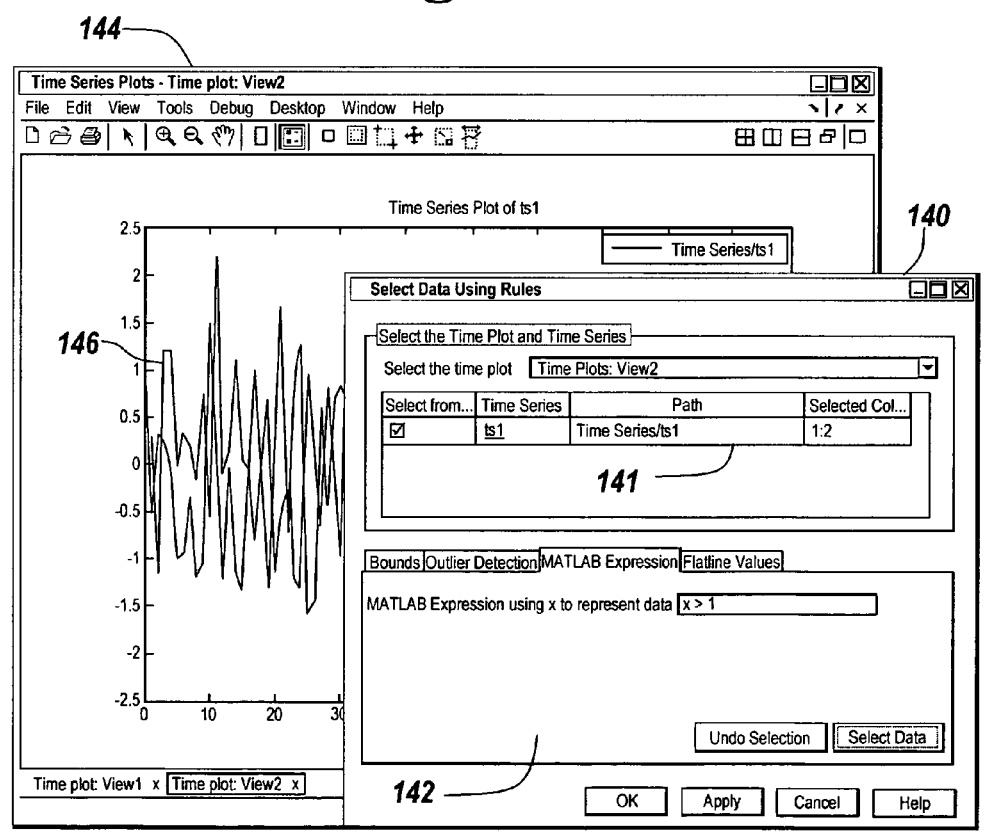

The illustrative embodiment of the present invention may select a subset of time series data using mathematical criteria defined by an expression, such as a MATLAB®expression, and/or other criteria dependent on data quality or status information. FIG. 9C shows an exemplary dialog 140 for selecting subsets of time series data using criteria defined by a MAT- LAB® expression or data quality information. The dialog 140 enables subsets of time series data to be selected for special manipulation using criteria defined in the dialog. The dialog 140 may provide a pane 141 for a user to specify one or more time series objects which are displayed in plot or graphic 144 from which a subset of data is to be selected. The dialog 140 may also provide a pane 142 that enables a user to input a MATLAB® expression (X>1) to define the subset of data to be selected from the time series objects specified in the pane 141. Those of skill in the art will appreciate that the MATLAB® expression is illustrative and the other types of expressions, such as differential or difference equations, may be used to define the subset of data in other embodiments. The subset of data can also be defined by the data quality or data status information described above with reference to FIG. 6. The tool 8 may apply the criteria defined in dialog 140 to determine the selected data which may then be shown in the background plot 144 with a different color 146. Selected data may also be defined graphically on plot 146 by using mouse gestures.

Figure 9D:
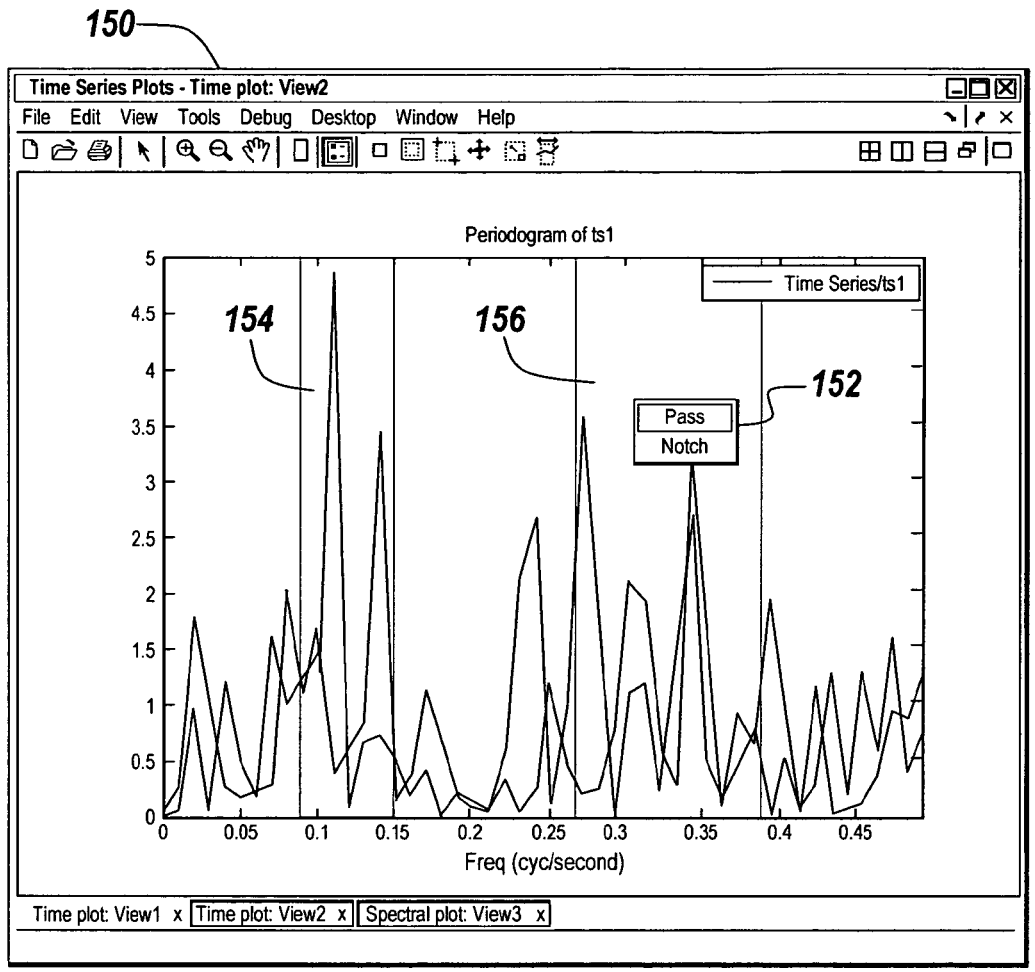

The illustrative embodiment may also filter time series data by selecting a subset of frequencies from a spectral representation of time series data FIG. 9D shows an exemplary graphical user interface 150 that enables a user to apply notch or band pass filters to time series data by graphical selection of frequency interval(s) on power spectrum or periodogram plots. In the graphical user interface 150, the user can select frequency interval(s) 154 and 156 on the spectral plot using a pointing device 19. When the cursor of the pointing device 19, for example, hovers over the selected intervals, a context menu 152 can be provided for the user to select a filter to suppress or pass frequencies in the selected intervals. The tool 8 may then apply a filter having the pass or stop bands defined by the selected frequency intervals to the time series data in the plot. These operations may either null out the spectrum inside or outside the selected frequency interval(s).

Figure 9E:
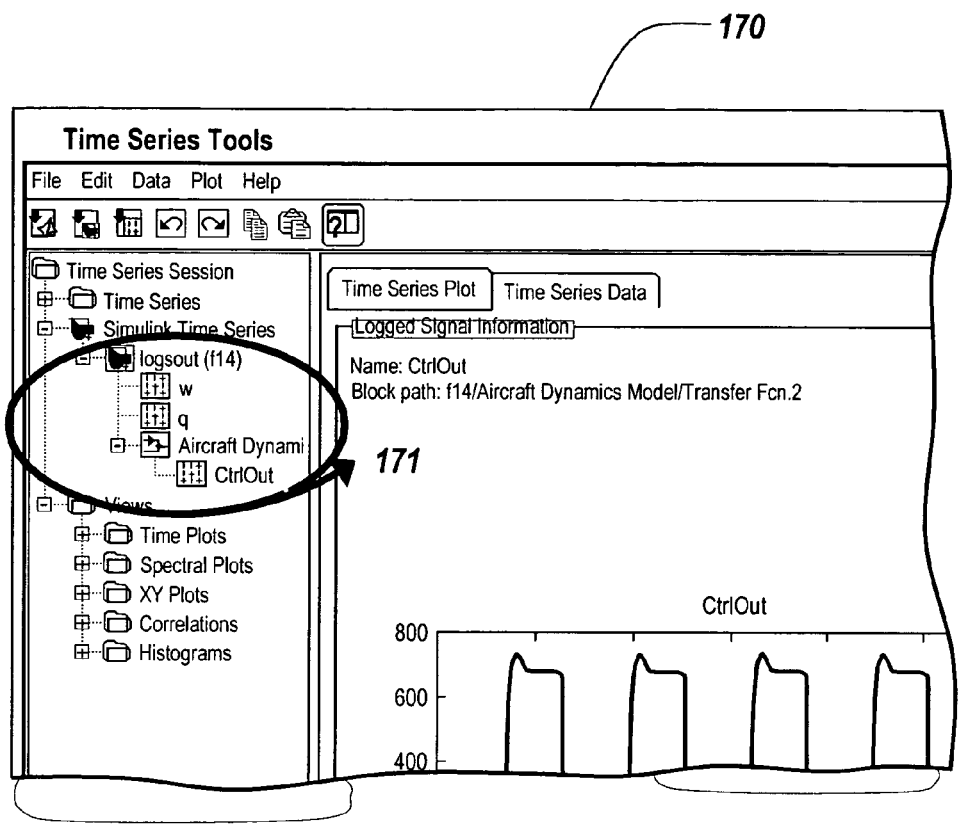

The tool 8 may provide a graphical user interface for displaying a hierarchical representation of time series data. FIG. 9E shows a hierarchical tree view representation of time series data logged from, for example, a simulation system. The graphical user interface 170 can be configured to open automatically at the end of a simulation where data or signals have been logged from the simulated model. A branch of the tree view 171 then displays the hierarchy of time series objects containing the logged data from the simulated model. This hierarchy and its contents may be updated every time the simulation is re-run. Once time series data is logged from the simulation and available in the time series graphical user interface 170, the data contained in the time series objects can be analyzed (e.g., computation of descriptive statistics, display of the periodogram/histogram etc.) or manipulated (e.g., shifted, filtered, data deleted, outliers removed etc.). If the user selects one of the time series objects in the tree view 171, the data contained in the selected time series object may be plotted or displayed in the interface 171 so that the user can analyze or manipulate the data.

Figure 9F:
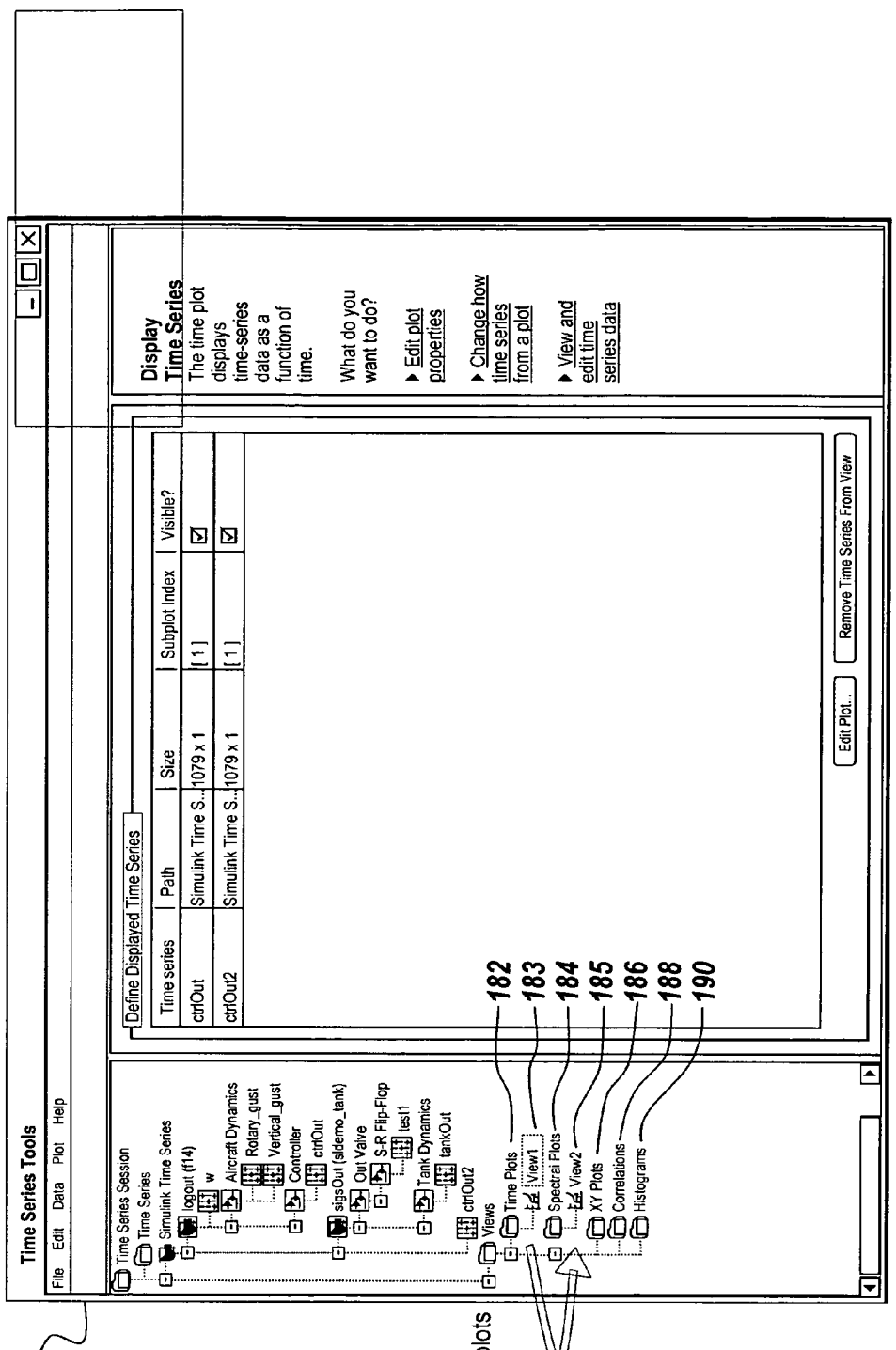

FIG. 9F is another exemplary graphical user interface 180 provided in the illustrative embodiment. The user interface 180 enables a user to move tree nodes representing plots from one 'container' tree node to another; in so doing changing the plot represented by the dragged tree node to conform to a characteristics defined by its new container. The graphical user interface 180 generates a plot node for each time series plot it generates. Depending on the type of plot, the plot node may appear as a child of one of the following container nodes: 'Time Plots' 182, 'Spectral Plots' 184, 'XY Plots' 186, 'Correlations' 188, or 'Histograms' 190. Once created, plot nodes can be dragged and dropped from one container node to another. The drop action may produce a new plot and plot node with the same time series contents as the original dragged plot node but of the new type defined by the destination container. For example, dragging a node labeled 'View1' 183 (representing a time plot displaying time series 'ts1' and 'ts2') and dropping that node onto the container node 'Spectral Plots' 184 may create a new periodogram plot of time series ts1 and ts2 and a new node labeled 'View2' 185 to represent the periodogram plot. If a plot contains a large number of time series this single drag and drop action may save the laborious task of redefining the contents of a plot each time the user wants to change its type.

The illustrative embodiment may provide edit modes for scaling and translating time series data. The graphical user interfaces of the illustrative embodiment may provide various graphical modes which enable mouse drag gestures to modify time series data. The edit mode may enable a user to select an entire time series in a plot and move it in horizontal and vertical directions in order to add/subtract constants from the time vector and/or the data array. The edit mode may also enable a user to select an entire time series in a plot and stretch it in a vertical direction about its mean value to apply a mean invariant resealing operation on the data array. The analysis tool 8 may provide an M-code recorder for generating M code equivalents of graphical actions which modify time series objects, such as mouse drags and table edits. The M code recorder translates the user's graphical actions into equivalent M code. The equivalency implies that the M code may have the same affect as the graphical operations when executed on original the time series objects. Once sequences of graphical actions have been recorded as M code equivalents, this code may be reapplied to new time series data to automate data processing actions that must be repeated on many time series objects.

Figure 10:
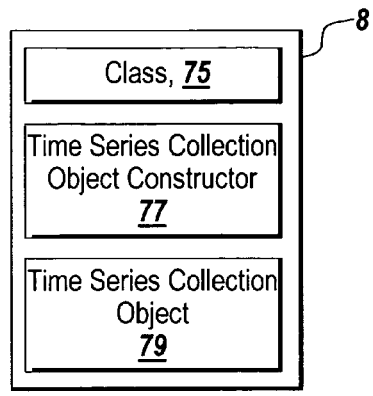
FIG. 10 is another embodiment of the analysis tool depicted in FIG. 1.

FIG. 10 depicts that the exemplary tool 8 for enabling a user to construct a time series collection object 79. The time series collection object 79 is an instantiation of the class 75. The class 75 defines the properties and methods of the time series collection object 79. The class 75 may contain a group of time series objects that share a common time vector to enable operations on related groups of synchronized time series data. A graphical user interface, which is similar to the graphical user interface depicted in FIG. 4B, may be provided to enable a user to construct a time series collection object by calling the following constructor 77.

Ts=tscollection (time); Creates a time series collection object with no member time series objects and a common time vector defined by the MATLAB® numeric array or cell array or data stings 'time'

Ts=tscollection(ts1); Creates a time series collection object based on the time series object 'ts1', i.e., the common time vector is defined by the time vector of 'ts1' and a copy of 'ts1' is the sole member time series of the time series collection.

Ts=tscollection (tscell); Creates a time series collection object based on the cell array of time series objects 'tscell' which have a common time vector, i.e., the tscollection object time vector is the common time vector and the member time series objects are copies of the contents of the cell array 'tscell'.

Those of ordinary skill in the art will appreciate that the constructor syntax described above is illustrative and other syntaxes may be used in other embodiments of the present invention.

The tool 8 may also provide an export tool for exporting the time, data, status and metadata stored within a time series collection object 35 into files. A graphical user interface, which is similar to the interface depicted in FIG. 4C, may be provided to enable a user to export the time series object, for example, into an Excel workbook so that the data in each of the encapsulated time series objects is added to a separate sheet in a spreadsheet. When the user saves the time series collection data in the workbook, the properties of the time series collection object including the time vector and the data in each of the encapsulated time series objects can be exported to the workbook where time and data arrays are assigned to columns of the spreadsheet and metadata is encoded as a header. Those or ordinary skill in the art will appreciate that the spreadsheet is illustrative and the time series collection object can be exported into other types of data sources, such MAT file and MATLAB® arrays in the MATLAB® environment.

Figure 11A:
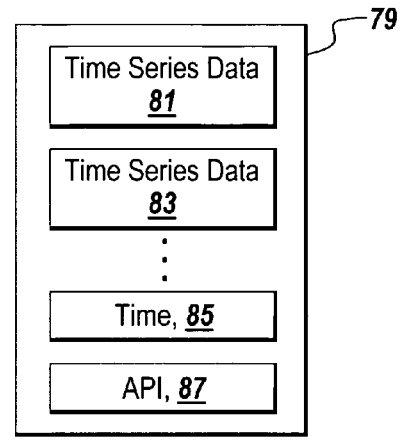
FIG. 11A shows an example of the time series collection object depicted in FIG. 10.

FIG. 11A shows an example of the time series collection object 79 constructed in the illustrative embodiment. The time series collection object 79 may have properties containing member time series objects 35, including time series objects 81 and 83. The time series collection object 79 encapsulates one or more time series objects 81 and 83 with different properties but the same time vector 85 into a single object. Each constituent time series object is a member of the time series collection object. Each member time series object is presented as the contents of a property of the time series collection object whose name is derived from the name of the member time series object.

A common reason for assembling time series objects into a time series collection object is to enable time interval(s) to be selected by inspection or analysis of one time series object in the time series collection object, but to have that selection apply to all time series objects in the time series collection object simultaneously. For example, a flight test data set may consist of multiple time series collected from various channels all with a common time vector. The flight data analyst may be interested in only in data (from all time series) collected during the time period when the altitude member time series was between 10,000 ft and 10,500 ft.

Another benefit of using the time series collection object to store multiple member time series data with the same time vector is the memory economy associated with storing the time vector only once, rather than separately for each time series. This centralized time vector storage is implemented in a manner which enables the user/developer to access and manipulate the time vector from any of the 'Time' properties of the time series collection object member time series objects without being aware of its storage within the time series collection.

The APIs 87 may provide methods for adding, removing, accessing and listing member time series objects. Examples of the APIs 87 may include delsamplefromcollection, getsampleusingtime and overloaded sub-referencing and subassignment methods provided in MATLAB®. The APIs 87 may provide an interface that enables time intervals to be used to extract data from all member time series in the time series collection object.

Figure 11B:
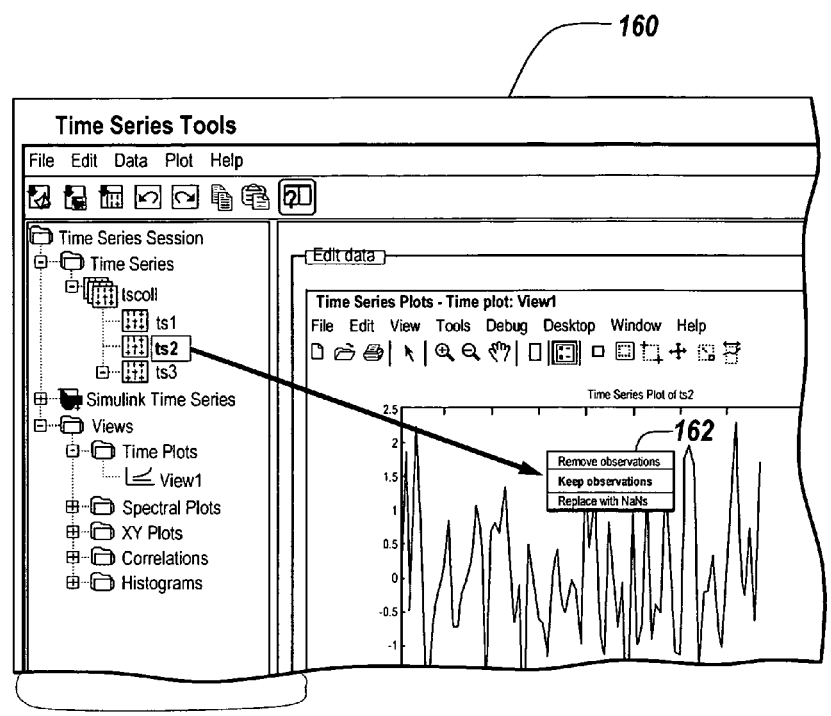
FIG. 11B shows another exemplary graphical user interface provided in the illustrative embodiment.

The illustrative embodiment may also provide a graphical user interface for restricting the time vectors of time series objects which are linked as a consequence of being members of the same time series collection to specific time interval. FIG. 11B shows an exemplary graphical user interface 160 that enables a user to restrict the time series objects in a time series collection object. The time series collection object links time series objects with a common time vector so that modification of the time interval(s) in one member time series object may automatically apply the same modification to all other members of the time series collection object. In the graphical user interface 144, the user may graphically select time interval(s) from one or more member time series objects of a time series collection that are displayed in a time plot, and then use a context menu 162 to keep or exclude all data in the selected time interval(s). The operation affects all of the member time series objects in the time series collection, not just those shown in the plot, since they all share a common time vector. The graphical user interface 160 shows data being retained in a single time interval from a time series 'ts2' which is a member of a time series collection object 'tscoll'. The resulting operation will be performed simultaneously on time series objects 'ts1', 'ts2' and 'ts3' since they all share the same time vector. In another embodiment, the user may shift the time vector of one of the time series object in the time series collection object. The operation also affects all member time series objects since they share a common time vector, so that the samples in all of the time series objects in the time series collection object may be shifted.

Figure 12:
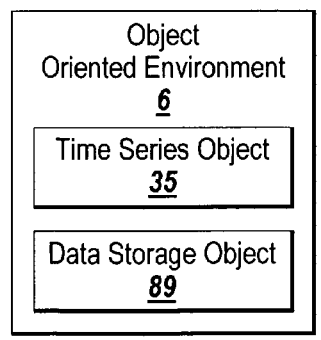
FIG. 12 is another exemplary object oriented environment that provides a data storage object for storing the data and/or time of the time series object.

In the illustrative embodiment, the data and time arrays of a time series object can be stored in a data storage object that represents a data source 4. FIG. 12 shows an exemplary object oriented environment that may provide a data storage object 89 for abstracting the data source 4. The data storage object 89 may represent the connection of the time series object data stored in internal or external files (MAT files, spreadsheets, text files), databases, or devices. The files can be MATLAB® memory mapped files. Abstraction of the data source can provide the option of storing the data of a time series object in an external data source, such as a database or file. The external data source enables a user to work more effectively with large data sets or with large numbers of time series, and can eliminate the need for the user to take explicit manual action to read or write from an external data source. Another advantage of the abstracted data source is the ability to store the data internally to the object-oriented environment in compressed form. The data storage object can be written so that internal data is stored using lossless compression or mathematical expressions in the form of MATLAB® function handles.

Figure 13:
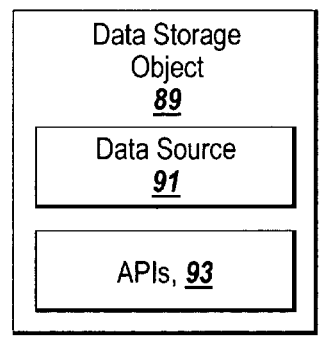
FIG. 13 is an example of the data storage object depicted in FIG. 12.

FIG. 13 is an example of the data storage object depicted in FIG. 12. The data storage object 89 may include the properties 91 of the data source 4. The data storage object 89 may implement standardized APIs 93 (i.e. APIs which do not depend on the data source type) that supply an interface for accessing data in the data source 4. The data storage object 89 translates those standardized API calls into source-specific API calls which access the data source so that the data in the data source can be accessed through the standardized methods of the APIs 93. When a user read or writes data to the data or time of the time series object, the data can be read from or written to the data source via the APIs 93 of the data storage object 89.

The time series data may represent multitude of data, such as time varying ensemble data generated by stochastic simulators, video signals, sound signals, parameter scan data and sensitivity analysis data and mathematical functions of time, in other embodiments. Since the time sampling of each simulation run can be completely different in stochastic simulations, the tool 8 may re-sample the time series simulation data to a common time vector, usually one with the shortest end time. Once re-sampled, the tool analyzes time series simulation data at every time step of the common time vector to get the mean and standard deviation. This information is used to generate the probability distribution curve as a function of time. Based on how the mean, standard deviation and probability density varies with time, a 3D surface is draped over it by creating a triangulated mesh. The surface is rendered using the color map and the lighting scheme selected by the user. Such a plot provides important information visually like how the mean varies as a function of time, how the spread varies with time, for a given species amount within the spread what the corresponding probability density is. Users can look at the plot and quickly glean critical information like what the mean and standard deviations are at any time, how they vary as a function of time, how the probability density function is distributed at a given time and how it varies with time.

The tool 8 can also be used to show the results of parameter scan and sensitivity analysis in a single plot. In parameter scan, a parameter is varied from lower to upper limit within its range, to generate similar time varying data. In sensitivity analysis, sensitivity of a state with multiple parameters is computed at any given time, but the parameters themselves can be varying with time. The tool 8 may depict information on how sensitive the model is to a parameter value, how the sensitivity varies as a function of time and how varying parameters affects simulation results.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method comprising:
   providing, to a display, a first graphical user interface element for creating a time series object in an object-oriented programming environment to encapsulate a time-indexed sequence of data;
   receiving, via the first graphical user interface element, an identification of at least one source for data values and time indices for the data values in the time-indexed sequence of data;
   creating the time series object, the time series object including:
      the data values,
      interpolation method information for identifying an interpolation method to be deployed in re-sampling the time-indexed sequence of data,
      the time indices, and
      object methods for operating on the data values to manipulate or analyze the time-indexed sequence of data; and
   linking, based on the creating, the interpolation method to the time-indexed sequence of data in the time series object, the linking:
      creating a relationship between the interpolation method and the time-indexed sequence of data in the time series object, and
      storing the interpolation method along with the time-indexed sequence of data in the time series object to maintain the relationship.

2. The method of claim 1, wherein the time series object further encapsulates metadata describing the time-indexed, sequence of data.

3. The method of claim 1, wherein the first graphical user interface element is for importing data from the at least one data source to create the time series object.

4. The method of claim 2, further comprising:
   exporting the data values, the metadata, and the time indices of the time series object into a predetermined format.

5. The method of claim 4, wherein the predetermined format comprises one of a spreadsheet format and a comma-separated values (CSV) file format.

6. The method of claim 1, further comprising:
   displaying a second graphical user interface element for re-sampling the time-indexed sequence of data on common time indices with another sequence of data.

7. The method of claim 1, further comprising:
   displaying a second graphical user interface element to select a subset of the time-indexed sequence of data by defining an expression or data quality.

8. The method of claim 1, further comprising:
   displaying a second graphical user interface element to apply a filter, differential equation or difference equation to the time series object.

9. The method of claim 8, further comprising:
   displaying an interface for selecting characteristics of the filter, the selecting performed by graphically selecting frequency intervals on spectral plots.

10. The method of claim 1, further comprising:
    displaying a second graphical user interface element to apply an operation performed on the time-indexed sequence of data, the operation excluding or including data samples in a manner which affects samples in other sequences of data.

11. The method of claim 1, further comprising:
    displaying a second graphical user interface element for showing a hierarchical representation of multiple objects.

12. The method of claim 1, further comprising:
    displaying a second graphical user interface element for representing a plot as node in a tree view; and
    modifying plot behavior and characteristics of the plot by moving the node within the tree view.

13. The method of claim 1, further comprising:
    generating code equivalents of graphical actions that modify the time-indexed sequence of data in the time series object; and
    packaging the code equivalents for re-application to other objects to automate sequences of graphical actions that need to be performed repeatedly.

14. The method of claim 1, wherein at least a subset of the object is written in a MATLAB®-compatible language.

15. A non-transitory computer-readable storage medium storing computer-executable instructions that when executed on a processor cause the processor to:
    provide, to a display, a first graphical user interface element for creating a time series object in an object-oriented programming environment to encapsulate a time-indexed sequence of data;
    receive via the first graphical user interface element an identification of at least one source of data values and time indices for the data values in the time-indexed sequence of data;
    create the time series object, the time series object including:
       the data values,
       interpolation method information for identifying an interpolation method to be deployed in re-sampling the time-indexed sequence of data,
       the time indices, and object methods for operating on the data values to manipulate or analyze the time-indexed sequence of data; and link, based on the creating, the interpolation method to the time-indexed sequence of data in the time series object, the linking:

creating a relationship between the interpolation method and the time-indexed sequence of data in the time series object, and, storing the interpolation method along with the time-indexed sequence of data in the time series object to maintain the relationship.

16. The medium of claim 15, wherein the time series object further encapsulates metadata describing the time-indexed sequence of data.

17. The medium of claim 15, wherein the first graphical user interface element is for importing data from the at least one data source to create the time-series object.

18. The medium of claim 16, further storing instructions that when executed on the processor cause the processor to export the data values, the metadata, and the time indices of the time series object into a predetermined format.

19. The medium of claim 18, wherein the predetermined format comprises one of a spreadsheet format and a comma-separated values (CSV) file format.

20. The medium of claim 15, further storing instructions that when executed on the processor cause the processor to display a second graphical user interface element for re-sampling the time-indexed sequence of data on common time indices with another sequence of data.

21. The medium of claim 15, further storing instructions that when executed on the processor cause the processor to display a second graphical user interface element for selecting a subset of the time-indexed sequence of data by defining an expression or data quality.

22. The medium of claim 15, further storing instructions that when executed on the processor cause the processor to display a second graphical user interface element to apply a filter, differential equation or difference equation to the time series object.

23. The medium of claim 15, further storing instructions that when executed on the processor cause the processor to display a second graphical user interface element to apply an operation performed on the time-indexed sequence of data, the operation excluding or including data samples in a manner which affects samples in other sequences of data.

24. The medium of claim 15, further storing instructions that when executed on the processor cause the processor to display a second graphical user interface element for showing a hierarchical representation of multiple objects.

25. The medium of claim 15, further storing instructions that when executed on the processor cause the processor to:
display a second graphical user interface element for representing a plot as a node in a tree view; and
modify plot behavior and characteristics of the plot by moving the node within the tree view.

26. The medium of claim 15, further storing instructions that when executed on the processor cause the processor to:

generate code equivalents of graphical actions that modify the time-indexed sequence of data in the time series object; and package the code equivalents for re-application to other objects to automate sequences of graphical actions that need to be performed repeatedly.

27. A system comprising:
a display;
a storage storing:
a first time series object encapsulating:
data values for a first sequence of data;
time indices for the data values of the first sequence of data;
a first event identifier for identifying where a first event occurs in the first sequence of data; and
first interpolation method information for identifying a first interpolation method to be deployed in re-sampling the first sequence of data,
the first interpolation method linked to the first sequence of data in the first time series object such that the first interpolation method is stored along with the first sequence of data in the first time series object to maintain a relationship between the first interpolation method and the first sequence of data;
a second time series object encapsulating:
data values for a second sequence of data;
time indices for the data values of the second sequence of data;
a second event identifier for identifying where a second event occurs in the second sequence of data; and
second interpolation method information for identifying a second interpolation method to be deployed in re-sampling the second sequence of data,
the second interpolation method linked to the second sequence of data in the second time series object such that the second interpolation method is stored along with the second sequence of data in the second time series object to maintain a relationship between the second interpolation method and the second sequence of data; and
a processor configured to display a first graphical user interface element on the display, the first graphical user interface element to align the first event with the second event by aligning the time indices of the first sequence of data with the time indices of the second sequence of data.

28. The method of claim 1, further comprising:
re-sampling the sequence of data using the interpolation method identified by the interpolation method information in the time series object.

29. The medium of claim 15, further storing instructions that when executed on a computer cause the computer to re-sample the sequence of data using the interpolation method identified by the interpolation method information in the time series object.

* * * * *

UNITED STATES PATENT AND TRADEMARK OFFICE
CERTIFICATE OF CORRECTION

| | | |
|---|---|---|
| PATENT NO. | : 8,904,299 B1 | Page 1 of 1 |
| APPLICATION NO. | : 11/488574 | |
| DATED | : December 2, 2014 | |
| INVENTOR(S) | : James G. Owen et al. | |

It is certified that error appears in the above-identified patent and that said Letters Patent is hereby corrected as shown below:

In the Claims

Column 15, line 66, in Claim 2, delete the "," after "time-indexed"

Column 17, line 9, in Claim 15, delete the "," after "and"

Signed and Sealed this
Fourteenth Day of April, 2015

Michelle K. Lee
*Director of the United States Patent and Trademark Office*